United States Patent [19]

Punater et al.

[11] Patent Number: 4,572,047

[45] Date of Patent: Feb. 25, 1986

[54] QUICK CHANGE SLITTER WHEEL HOLDER

[75] Inventors: Dinesh G. Punater, Dayton; Gene E. Graves, Centerville, both of Ohio

[73] Assignee: Harris Graphics Corporation, Melbourne, Fla.

[21] Appl. No.: 615,846

[22] Filed: May 31, 1984

[51] Int. Cl.[4] ............................................. B26D 1/16
[52] U.S. Cl. ...................... 83/481; 83/508.2; 83/676; 83/699; 279/2 R
[58] Field of Search .............. 83/481, 508.2, 508.3, 83/671, 676, 677, 698, 699; 279/2 R, 75

[56] References Cited

U.S. PATENT DOCUMENTS

| | | | |
|---|---|---|---|
| 1,407,145 | 2/1922 | Gasteiner | 279/2 R |
| 1,465,966 | 8/1923 | Cameron et al. | 83/482 |
| 1,944,255 | 1/1934 | McFall et al. | 279/2 R |
| 2,255,885 | 9/1941 | Herbst . | |
| 2,868,548 | 1/1959 | Lappin et al. | 279/2 |
| 3,173,325 | 3/1965 | Warren et al. | 83/499 |
| 3,266,535 | 8/1966 | Brodie | 83/481 |
| 3,360,276 | 12/1967 | Peffer | 279/2 |
| 3,501,989 | 3/1970 | Lukaczyn | 83/504 |
| 3,651,728 | 3/1972 | Young | 83/474 |
| 3,727,908 | 4/1973 | Whitesell et al. | 270/53 |
| 3,761,008 | 9/1973 | Goulder | 279/2 |
| 3,831,480 | 8/1974 | Phillips | 83/481 |
| 3,837,265 | 9/1974 | Tokuno | 93/58.2 |
| 3,905,264 | 9/1975 | Eddy | 83/481 |
| 3,908,499 | 9/1975 | Reed | 83/665 |
| 4,177,730 | 12/1979 | Schriber et al. | 101/248 |

Primary Examiner—Frank T. Yost
Assistant Examiner—Hien H. Phan
Attorney, Agent, or Firm—Biebel, French & Nauman

[57] ABSTRACT

A quick-release mounting for a cutting wheel comprises a housing adjustably mounted in an arm, and a hollow shaft rotatably supported in the housing. The shaft has an expandable collet hub on which a wheel can be received. A mandrel extends within the shaft and has a tapered part to expand the collet hub; the mandrel is spring loaded toward expanding the hub, and a handle on the mandrel allows thrusting the mandrel in opposition to the spring load for release of a wheel. Locking members guard against accidental release of a wheel from the shaft, and an adjustable stop prevents overtightening the collet hub. Adjustments of the mounting to mount or dismount a wheel and to change position thereof can all be accomplished without need for tools.

5 Claims, 2 Drawing Figures

U.S. Patent   Feb. 25, 1986   4,572,047 operating handle or knob and a spring acts between the knob and the cylindrical housing, urging the mandrel in a direction to open or expand the collet hub. Thus, in its normal condition the hollow shaft, its collet hub, and the internal mandrel are urged or biased to a condition where the cutting wheel is firmly held on its supporting shaft.

There is a latching member, preferably in the form of one or more ball members that protrude partially through openings in the end of the hollow supporting shaft, outboard of the collet hub, on the opposite side of a mounted cutting wheel from the aforementioned locating flange. Interiorly of the shaft, this latching ball member rests against a head on the mandrel which supports the latching ball protruding somewhat through its corresponding opening and beyond the outer diameter of the end of the supporting shaft. Therefore, in the normal position the latching ball member or members function as a retaining arrangement which will prevent the cutting wheel from accidentally spinning off the end of its supporting shaft should the wheel for some reason become loosened from its tight fit with the expanded collet hub.

To release a cutting wheel, an operator merely presses longitudinally on the knob to shift the mandrel against the force of the spring. This moves the tapered part of the locking member at the opposite end of the mandrel longitudinally with respect to the collet hub and releases the force tending to expand the collet hub against the aperture in the cutting wheel. At the same time, an undercut section at this end of the mandrel is moved into alignment with the latching ball member, and it can move inwardly as the cutting wheel is pulled off the supporting end of the hollow shaft, across the aperture through which the latching ball member normally projects. Therefore, a simple longitudinal thrust upon the knob, shifting the mandrel, will release the force which otherwise normally engages the collet hub against the central aperture of the cutting wheel, and also release the latching ball member. Thus a cutting wheel can be quickly dismounted or mounted, and either sharpened or replaced as may be desired. A stop member is provided on the mandrel to prevent overtightening the collet hub to such extent that an operator cannot readily release it with the knob.

The cylindrical housing for the hollow shaft preferably has a threaded exterior which, when the housing is rotated within the threaded opening in the mounting arm, provides for a fine adjustment of the assembled cutting wheel and its supporting shaft, within predetermined limits. In addition, the entire assembly including the block or body on which the mounting arm is carried can be shifted across the supporting cross rod to a selected position with respect to the web, as previously mentioned. The complete wheel change and position adjustment can be accomplished without need for tools.

The primary object of the invention, therefore, is to provide a unique quick-release mounting device for cutting wheels used to slit and/or perforate webs of material; to provide such a device which can accurately locate the edge of the cutting wheel with respect to the web, within close tolerance; to provide such device in which a simple thrust against the locking mechanism can release the force normally attending to lock a cutting wheel to its rotatable supporting shaft; to provide such a locking mechanism wherein a latching member normally interferes with removal of the cutting wheel from its supporting shaft, to inhibit accidental dislodgment of the wheel from the shaft especially during operation, and in which the releasing thrust also provides for withdrawal of the latching member; and to provide such a device which can be located and used in a rapid and accurate manner without need for tools.

Other objects and advantages of the invention will be apparent from the following description, the accompanying drawings and the appended claims.

DESCRIPTION OF THE PREFERRED EMBODIMENT

Figure 1:
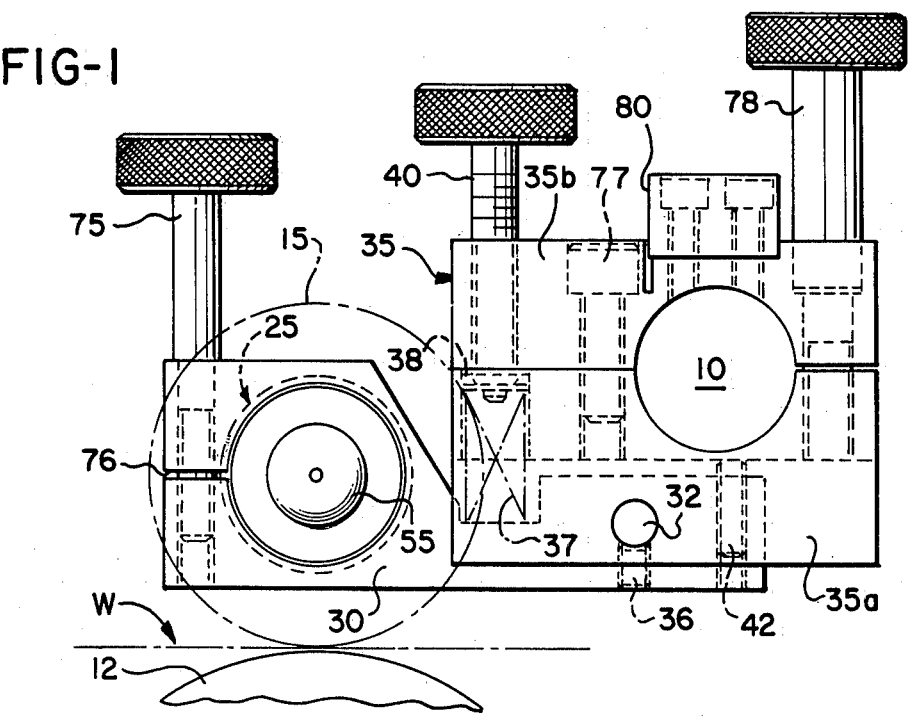
FIG. 1 is a side elevational view showing the general arrangement of the mounting mechanism and the various clamping screws associated therewith, and showing in phantom outline a typical cutting wheel acting against a segment of a passing web.

Slitting and/or perforating cutting wheels are described in U.S. Pat. No. 4,177,730, and are well known. In general, a cross bar 10 (FIG. 1) is provided in a press or collator, extending across the web path which is indicated at W, passing over an anvil cylinder or wheel 12.

The present invention relates to a novel quick-release mounting arrangement for a cutting wheel 15, wherein the shaft 20 for supporting the wheel is a hollow shaft mounted within bearings 22 that are contained in a cylindrical housing 25. A shoulder 26 on the shaft engages one bearing, and a snap ring 27 fitted to shaft 20 engages the other bearing, to confine the shaft in a lateral direction. The housing 25 in turn has an external thread 28 fitted into a suitable correspondingly threaded opening in a supporting arm 30. Arm 30 is pivotally mounted on a pin 32 mounted in a split support block 35, and held in position by set screw 36. The arm is spring-loaded in a direction to rotate the cutting wheel toward the passing web, by a spring 37 which acts between arm 30 and a disc 38 fitted to the end of a pressure adjusting screw 40 threaded into the upper part 35b of block 35. A set screw 42 in the arm 30 acts against the lower part 35a of the block to provide an adjustable lower limit to this spring action. The block 35 in turn is movably supported upon cross bar 10 which extends transversely of the passing web.

The end of the cutting wheel support shaft 20 is provided with an expandable collet hub 45, preferably a split collet arrangement, which is dimensioned to fit closely through the standard sized opening 47 in the center of the cutting wheel 15. The hub is fitted with a flange 48 against which the wheel is pressed as it is slipped over the collet hub, to locate the wheel precisely along its support shaft.

Within the hollow shaft there is a mandrel 50 which is shiftable longitudinally within the hollow shaft, but has a close sliding fit with the shaft at the central region 51 to maintain concentricity of the shaft and mandrel. The mandrel has a tapered part 52 (preferably about 2° taper) that, when pressed within the collet hub 45, urges the hub to expand evenly and lock inside the cutting wheel opening. At the other end of mandrel 50, protruding from the hollow shaft 20, there is an operating handle or knob 55 attached to the mandrel by a set screw 56 and a spring 57 acts between the knob and the

QUICK CHANGE SLITTER WHEEL HOLDER

BACKGROUND OF THE INVENTION

This invention relates to the mounting of cutting wheels, particularly as used in web processing machines for the purpose of slitting or perforating one or more webs longitudinally as the web moves between the cutting wheel and a backup device such as an anvil roller.

While there are many applications of such devices, cutting and/or longitudinal perforating wheels of this type are particularly used in connection with the manufacture of business forms, either in business forms presses or in collators for assembling multi-part business forms. Examples of such presses and collators are disclosed and described in U.S. Pat. No. 4,177,730 issued Dec. 11, 1979 and U.S. Pat. No. 3,727,908 issued Apr. 17, 1973 both of which are owned by the assignee of this application.

The cutting wheels must make a precise sharp cut (slit or perforation) in the web, and since the web or webs upon which the cutting wheels act may often be moving past the wheels at speeds in the order of 500 to 1000 Ft. per minute, or more, there is a need to replace the wheels for sharpening and other maintenance purposes. In addition, a particular job requirement may call for different types of perforations, requiring substitution of perforating wheels having different teeth dimensions. Therefore, it is desirable to provide a mounting for such cutting wheels which enables quick release of the cutting wheel from the freely rotatable shaft upon which the wheel is supported.

For many years slitter wheel holders have been available to the business forms manufacturing art, in which the holder comprises a block mounted on a cross rod or tube which extends transversely of the web being processed, the block being adjustable along the cross rod to select any desired position of the slitter wheel within the width of the web. On this block there is a pivoted arm which can move within limits toward and away from the web, and which preferably is spring loaded toward the web, and a circular housing is threaded into the end of the arm, allowing a limited adjustment of the housing within the end of the arm to permit a precise or fine adjustment of the slitter wheel position with respect to the arm and the holder block. This housing also contains bearings which support a shaft that is free to rotate in the bearings, and contains a collet over which a slitter wheel can be placed. A typical rod with a tapered end extends through the collet and the shaft, and can be tightened by a nut at the opposite end of the housing from the collet, to expand the collet and grip the cutting wheel. Once the wheel is in place and the fine adjustment (if any) is made, there is a hand operated clamping bolt which can be tightened to cause the end of the arm to tighten around the threads on the housing, maintaining the adjusted position of the parts.

In order to replace the cutting wheel in such devices it is necessary to have a set of tools, one to retain the position of the central rod and the other to loosen, and then tighten, the nut at the end of the rod, so as to allow the collet to contract to free the wheel, and then to expand to grip the next wheel. This requires the operator to keep these tools, usually an Allen wrench and an open end wrench available for his use in making this change, and in addition should it be necessary to adjust the position of the block along the supporting rod, an additional wrench of a different size, usually a larger Allen wrench to fit the larger socket head bolts in the block, is also required. Finally, in spite of the best efforts of the operator to secure the cutting wheels on the collet, these are subjected to substantial forces in operation. Web speeds in the order of 1000 Ft. per minute or more are common, and the freely rotating slitter wheels tend to rotate at comparable speeds, while being forced against the web or webs, usually working against an anvil roll or cylinder, while making the required perforations or continuous slits in the web. If the collet is not securely expanded to lock the wheel thereon, it is possible for the wheel to work loose and disengage from the holder, while rotating at substantial speed. This of course could present considerable danger since the wheels are, in general, steel discs with a sharp rim or edge, several inches in diameter.

Efforts have been made to reduce makeready time on business forms presses and collators, and the method and system described in the aforementioned U.S. Pat. No. 4,177,730 represents the first concerted effort to reduce makeready on an overall basis. Time studies with machinery of this type have indicated that when the press operator is required to utilize tools to dismount and re-mount slitter wheels, and to adjust the lateral register of the slitter wheel and holder, an average of six minutes is required to perform the necessary functions. It has also been discovered that as many as ten to fifteen cutting wheel changes per eight hour shift may be required, and thus it follows that it is possible that the operator might be required to devote as much as sixty to ninety minutes per shift just for the function of makeready of the cutting wheels or slitters.

SUMMARY OF THE INVENTION

The present invention relates to a novel quick-release mounting arrangement for such cutting wheels, wherein the shaft for supporting the wheel is a hollow shaft mounted within bearings that are contained in a cylindrical housing. The housing in turn is threaded into a suitable correspondingly threaded opening in a supporting arm, and that arm is pivotally mounted on a split or two piece block, the arm being spring-loaded in a direction to rotate toward the passing web. The block in turn is movably supported upon a cross shaft which extends transversely of the passing web, so as to adjust the location of the assembly, and hence the cutting wheel, precisely to locate width-wise the longitudinal slit or perforations that the cutting wheel is to make in the webs or web. One of the clamping bolts, which join the parts of the block around the cross shaft, is provided with a large knurled head by which this bolt can be hand operated.

The end of the cutting wheel support shaft is provided with an expandable collet hub, preferably a split collet arrangement, which is dimensioned to fit closely through the standard sized opening in the center of the cutting wheel. The hub is fitted with a flange against which the wheel is pressed as it is slipped over the collet hub, to locate the wheel precisely along its support shaft. Within the hollow shaft there is a mandrel which has a close sliding fit to the shaft, and is shiftable longitudinally within the hollow shaft. The mandrel has a tapered part that, when pressed within the collet hub, urges the hub to expand and lock against the edges of the cutting wheel opening. At the other end of the mandrel protruding from the hollow shaft, there is an cylindrical housing, urging the mandrel in a direction to expand the collet hub 45 (to the right in FIG. 2). Thus, in its normal condition the hollow shaft 20, its collet hub 45, and the internal mandrel 50 are urged or biased to a condition where the cutting wheel is firmly held on its supporting shaft.

A stop screw 60 with a large flat head 61 is threaded into the collet hub end of the mandrel, and is locked into an adjusted position by a set screw 63. The head 61 abuts the end of shaft 20 and thus limits the locking movement of mandrel 50 to avoid over-tightening the collet hub to such an extent that it could not readily be released by thrusting on knob 55.

Figure 2:
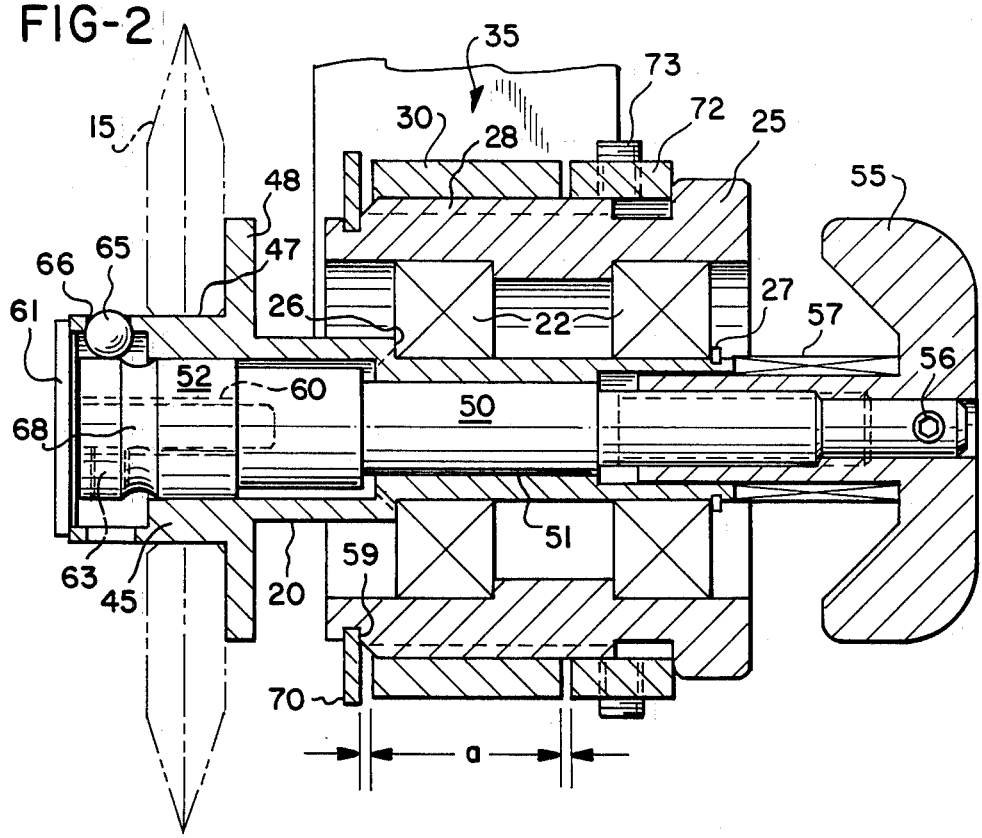
FIG. 2 is an enlarged horizontal cross-sectional view, taken generally on line 2—2 in FIG. 1, showing details of the quick release rotary cutting wheel mounting mechanism provided by the invention.

There is a latching member, preferably in the form of one or more ball members 65 that protrude partially through openings 66 in the end of the hollow supporting shaft, outboard of the collet hub, on the opposite side of a mounted cutting wheel from the aforementioned locating flange. Interiorly of the shaft, this latching ball member rests against the mandrel head, inward of stop screw head 61, to support the latching ball protruding somewhat through its corresponding opening and beyond the outer diameter of the end of the supporting shaft, as shown in FIG. 2. Therefore, in the normal position the latching ball member or members function as a retaining arrangement which will engage the hub of the cutting wheel before it reaches the end of its supporting shaft, should the wheel for some reason become loosened from its tight fit with the expanded collet hub.

To release a cutting wheel 15, an operator merely presses longitudinally on the knob 55 to shift the mandrel 50 against the force of the spring 57. This moves the tapered part 52 of the locking member at the opposite end of the mandrel longitudinally with respect to the collet hub and releases the force tending to expand the collet hub against the aperture 47 in the cutting wheel 15. At the same time, an undercut section 68 at this end of the mandrel is moved into alignment with the latching ball member, so the ball can move inwardly as the cutting wheel is pulled off the supporting end of the hollow shaft, across the aperture through which the latching ball member normally projects. Therefore, a simple longitudinal thrust upon the knob, shifting the mandrel, will release the force which otherwise normally engages the collet hub against the central aperture of the cutting wheel, and also release the latching ball member. Thus a cutting wheel can be quickly dismounted or mounted, and either sharpened or replaced as may be desired. No tools are required to do this.

As previously mentioned, the cylindrical housing 25 has a threaded exterior, thus when the housing is rotated within the threaded opening in the supporting arm 30, this provides for a lateral fine adjustment of the edge of a mounted cutting wheel. The range of this adjustment is indicated by the legend a in FIG. 2.

A retaining ring 70, fitted in a groove 59 on the housing, prevents accidental withdrawal of the housing. At the other end of the housing a retainer sleeve 72 is fitted over the threads 28 on the housing, and can be locked in place by set screws 73. A clamp screw 75 (FIG. 1) with a large knurled head extends across a split 76 in the end of the block 30, to hand tighten the threads once the housing is finally adjusted into position. Again, no tools are needed.

Block 35 is comprised of two pieces, 35a and 35b, fastened together by a recessed cap screw 77, and a clamp screw 78, with a large knurled head, which can be loosened by hand to allow the block to slide along bar 10 to a desired location. Thus, even the major adjusting movements of the block can be accomplished without need for tools. The small block 80, attached to the upper block piece 35b, provides an anchor attachment (if desired) for a side register measuring device.

While the form of apparatus herein described constitutes a preferred embodiment of this invention, it is to be understood that the invention is not limited to this precise form of apparatus, and that changes may be made therein without departing from the scope of the invention, which is defined in the appended claims.

What is claimed is:

1. In a holder for a sharpened cutting wheel having a concentric central aperture of predetermined diameter, said holder including
   a hollow shaft,
   a housing surrounding said shaft and including bearing means supporting said shaft for rotation,
   a collet at one end of said shaft and sized to fit closely within the aperture of the cutting wheel,
   means on said hub for locating the cutting wheel thereon,
   a mandrel having first and second ends and extending through said shaft, and
   locking means on said first end of said mandrel coacting with said collet hub to lock the cutting wheel on said hub;
   the improvement comprising
   spring means urging said mandrel in a direction to engage said locking means,
   means for moving said mandrel in opposition to said urging means to release said locking means for quick removal of the cutting wheel, and
   a retractable latch member on said collet hub spaced from said locating means and movable outward of said one end of said shaft to interfere with removal of the cutting wheel from said collet hub.

2. A cutting wheel holder as defined in claim 1, wherein
   said means for moving said mandrel is a knob fixed to said second end of said mandrel, and
   said urging means is a spring acting between said housing and said knob.

3. A cutting wheel holder as defined in claim 1, wherein
   said locating means is a flange member extending outwardly from said shaft adjacent said collet hub,
   said hub is an expandable split collet and said locking means is a tapered section on said mandrel acting against the interior of said split collet to expand said collet against the aperture in the cutting wheel in response to axial movement of said mandrel within said shaft, and
   stop means on said mandrel limiting the action of said tapered section to expand said collet.

4. A cutting wheel holder as defined in claim 3, wherein
   said hollow shaft has at least one opening therein facing transversely to the axis of said shaft and located outboard of said collet hub,
   said latching member is a ball extending partially through said opening and normally held therein by said first end of said mandrel, and
   said one end of said mandrel having an undercut section normally spaced from said ball and movable under said ball to allow inward movement of said ball upon movement of said mandrel to release said locking means.

5. A cutting wheel holder as defined in claim 1, including means on said first end of said mandrel cooperating with said latch member to allow withdrawal of said latch member and removal of a cutting wheel from said collet hub.

* * * * *